United States Patent
Shi

(10) Patent No.: US 11,977,814 B2
(45) Date of Patent: May 7, 2024

(54) AUDIO OUTPUT METHOD AND MOBILE TERMINAL

(71) Applicant: VIVO MOBILE COMMUNICATION CO., LTD., Guangdong (CN)

(72) Inventor: Jianxing Shi, Dongguan (CN)

(73) Assignee: Vivo Mobile Communication Co., Ltd., Dongguan (CN)

( * ) Notice: Subject to any disclaimer, the term of this patent is extended or adjusted under 35 U.S.C. 154(b) by 475 days.

(21) Appl. No.: 17/350,360

(22) Filed: Jun. 17, 2021

(65) Prior Publication Data

US 2021/0311696 A1 Oct. 7, 2021

Related U.S. Application Data

(63) Continuation of application No. PCT/CN2019/117456, filed on Nov. 12, 2019.

(30) Foreign Application Priority Data

Dec. 21, 2018 (CN) .......................... 201811571156.X

(51) Int. Cl.
*G06F 3/16* (2006.01)
*G06F 3/01* (2006.01)
*H04M 1/02* (2006.01)

(52) U.S. Cl.
CPC .............. *G06F 3/165* (2013.01); *G06F 3/016* (2013.01); *H04M 1/0214* (2013.01); *H04M 1/0268* (2013.01)

(58) Field of Classification Search
CPC ...... G06F 3/165; G06F 3/016; H04M 1/0214; H04M 1/0268
See application file for complete search history.

(56) References Cited

U.S. PATENT DOCUMENTS

| 11,516,325 B2 * | 11/2022 | Liao ................... H04M 1/0268 |
| 2014/0241551 A1 | 8/2014 | Kim et al. |
| 2015/0062025 A1 * | 3/2015 | Lee ....................... G06F 1/1626 345/173 |

(Continued)

FOREIGN PATENT DOCUMENTS

| CN | 104571534 A | 4/2015 |
| CN | 105843464 A | 8/2016 |

(Continued)

OTHER PUBLICATIONS

Supplementary European Search Report regarding Patent Application No. 19898398.3-1203/3901759; PCT/CN2019/117456, dated Jan. 31, 2022.

(Continued)

*Primary Examiner* — Sisay Yacob

(74) *Attorney, Agent, or Firm* — Harness, Dickey & Pierce, P.L.C.

(57) ABSTRACT

An audio output method applied to a mobile terminal, the screen of the mobile terminal comprises a first screen area provided with a first vibration unit, and a second screen area provided with a second vibration unit. The method includes: detecting a first folding state of the first screen area relative to the second screen area; and controlling working states of the first vibration unit and the second vibration unit according to the first folding state in a scenario that audio output is satisfied.

20 Claims, 3 Drawing Sheets

(56) References Cited

U.S. PATENT DOCUMENTS

| | | |
|---|---|---|
| 2016/0085319 A1 | 3/2016 | Kim et al. |
| 2016/0231813 A1 | 8/2016 | Xu |
| 2017/0060248 A1* | 3/2017 | Modarres ............... G06F 1/1652 |
| 2018/0035208 A1 | 2/2018 | Choi et al. |
| 2021/0058502 A1* | 2/2021 | Liao ...................... G06F 1/1616 |

FOREIGN PATENT DOCUMENTS

| | | |
|---|---|---|
| CN | 206725981 U | 12/2017 |
| CN | 107728810 A | 2/2018 |
| CN | 107948874 A | 4/2018 |
| CN | 108040313 A | 5/2018 |
| CN | 108124224 A | 6/2018 |
| CN | 108536411 A | 9/2018 |
| CN | 109739465 A | 5/2019 |
| EP | 2947857 A2 | 11/2015 |
| EP | 3331251 A1 | 6/2018 |

OTHER PUBLICATIONS

International Search Report and Written Opinion of the International Searching Authority regarding International Patent Application No. PCT/2019/117456, dated Jan. 23, 2020. Translation provided by Bohui Intellectual Property.

First Office Action regarding Chinese Patent Application No. 201811571156.X, dated Dec. 6, 2019. Translation provided by Bohui Intellectual Property.

Second Office Action regarding Chinese Patent Application No. 201811571156.X, dated Apr. 29, 2020. Translation provided by Bohui Intellectual Property.

Third Office Action regarding Chinese Patent Application No. 201811571156.X, dated Sep. 3, 2020. Translation provided by Bohui Intellectual Property.

* cited by examiner

AUDIO OUTPUT METHOD AND MOBILE TERMINAL

CROSS-REFERENCE TO RELATED APPLICATIONS

This application is a Bypass Continuation Application of PCT/CN2019/117456 filed on Nov. 12, 2019, which claims priority to Chinese Patent Application No. 201811571156.X filed on Dec. 21, 2018, which are incorporated herein by reference in their entirety.

TECHNICAL FIELD

Embodiments of the present disclosure relate to the field of communications technologies, and in particular, to an audio output method and a mobile terminal.

BACKGROUND

As large-sized screens are increasingly popular among consumers, the major mobile terminal vendors are launching mobile terminals with high screen-to-body ratios to enhance attractiveness of their products to consumers.

However, a mobile terminal in the related art is usually disposed with a hole at the top or bottom of its front facet to provide a sound generating device such as a loudspeaker to make a sound. In this case, the provision of the sound generating device in the related art will limit the size of the display screen, resulting in a low screen-to-body ratio of the mobile terminal.

SUMMARY

According to a first aspect, an embodiment of the present disclosure provides an audio output method applied to a mobile terminal, where a flexible display screen of the mobile terminal includes a first screen area provided with a first vibration unit, and a second screen area provided with a second vibration unit;
  the method includes:
    detecting a first folding state of the first screen area relative to the second screen area; and
    controlling working states of the first vibration unit and the second vibration unit according to the first folding state in a scenario that audio output is satisfied.
  According to a second aspect, an embodiment of the present disclosure further provides a mobile terminal, where a flexible display screen of the mobile terminal includes a first screen area provided with the first vibration unit, and a second screen area provided with the second vibration unit;
  the mobile terminal includes:
    a first detection module, configured to detect a first folding state of the first screen area relative to the second screen area; and
    a control module, configured to control working states of the first vibration unit and the second vibration unit according to the first folding state in a scenario that audio output is satisfied.
  According to a third aspect, an embodiment of the present disclosure further provides a mobile terminal, where the mobile terminal includes a processor, a memory, and a computer program that is stored in the memory and that executable on the processor, and when the computer program is executed by the processor, steps of the foregoing audio output method are implemented.

According to a fourth aspect, an embodiment of the present disclosure further provides a non-transitory computer-readable storage medium, where a computer program is stored in the non-transitory computer-readable storage medium, and when the computer program is executed by a processor, steps of the foregoing audio output method are implemented.

DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Terms "first" and "second" in this application are used to distinguish between similar objects, and do not need to be used to describe a specific order or sequence. In addition, terms "include", "have", and any modification thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, "and/or" used in this application means at least one of the connected objects. For example, A and/or B and/or C represents the following seven cases: Only A exists, only B exists, only C exists, both A and B exist, both B and C exist, both A and C exist, or A, B, and C all exist.

The screen of the mobile terminal according to the embodiment of the present disclosure may include at least a first screen area provided with a first vibration unit and a second screen area provided with a second vibration unit. The vibration unit may drive the screen to vibrate and make a sound through its own vibration. For example, the vibration unit may be but is not limited to an exciter or a motor. In addition, the screen may be a flexible screen or a collapsible screen.

Figure 1:
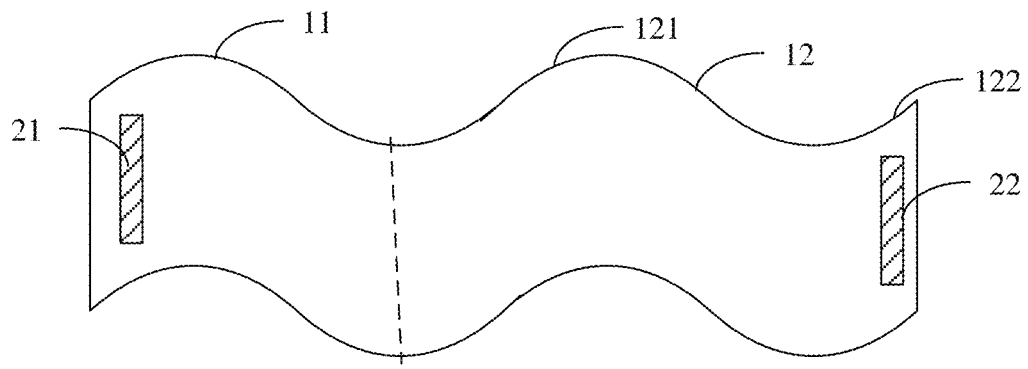
FIG. 1 is a schematic diagram of a flexible screen according to an embodiment of the present disclosure.

For easy understanding, refer to FIG. 1. As shown in FIG. 1, the screen includes a first screen area 11 provided with a first vibration unit 21 and a second screen area 12 provided with a second vibration unit 22.

As shown in FIG. 1, the screen may be divided into the first screen area 11 and the second screen area 12 along a dash line. The dash line may be understood as a folding line of the screen. However, it should be noted that the folding line in FIG. 1 is only an example, and the embodiments of the present disclosure do not limit a folding position of the screen. In addition, it should be understood that in the case that the screen folds along another folding line, the first screen area and the second screen area will change.

As shown in FIG. 1, the first vibration unit 21 is provided at a first end of the screen, and the second vibration unit 22 is provided at a second end of the screen opposite to the first end. In other words, in the embodiment of the present disclosure, one vibration unit, such as an exciter, which can drive the screen to vibrate, may be provided at each of two ends of the screen to drive the screen to vibrate and make a sound. Further, the first vibration unit and the second vibration unit are symmetrically arranged on the screen, to enhance the sound generating effect of the screen. However, it should be noted that the position and the quantity of vibration units arranged on the screen are only examples, and the present disclosure does not limit a position and a quantity of the vibration units arranged.

In a practical application, the mobile terminal may be a mobile phone, a tablet personal computer, a laptop computer, a personal digital assistant (PDA), a mobile Internet device (MID), a wearable device, or the like.

The audio output method according to the embodiment of the present disclosure may be applied to the foregoing mobile terminal. The audio output method according to the embodiment of the present disclosure will be described below.

Figure 2:
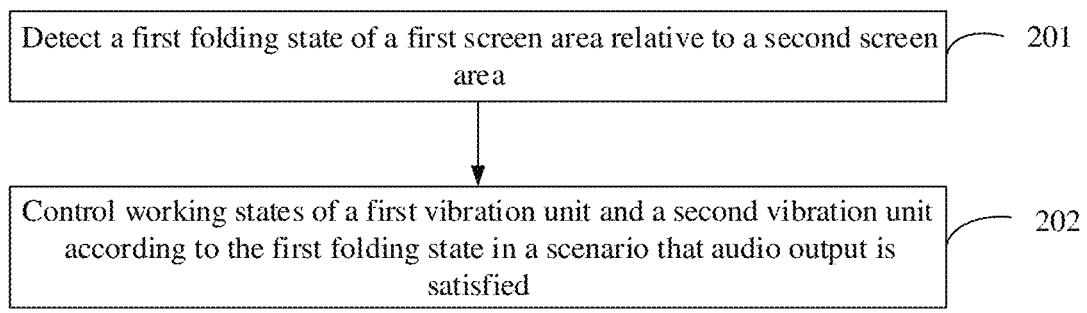
FIG. 2 is a flowchart 1 of an audio output method according to an embodiment of the present disclosure.

Refer to FIG. 2, which is a flowchart 1 of an audio output method according to an embodiment of the present disclosure. As shown in FIG. 2, the audio output method according to this embodiment includes the following steps:

Step 201. Detect a first folding state of the first screen area relative to the second screen area.

In this step, detecting the first folding state of the first screen area relative to the second screen area may be understood as detecting whether the first screen area folds relative to the second screen area.

Step 202. Control working states of the first vibration unit and the second vibration unit according to the first folding state in a scenario that audio output is satisfied.

In the embodiments of the present disclosure, the mobile terminal may not output audio in a scenario of satisfying audio output but satisfies an audio output condition, that is, the mobile terminal may be in a state of waiting to output audio; alternatively, the mobile terminal may output audio, that is, the mobile terminal is in a state of outputting audio.

In some implementations of the present disclosure, satisfying an audio output condition may include any one of the following:

detecting a touch operation for triggering the play of a multimedia file; and receiving a call request;

where the multimedia file may include but is not limited to a music file, a video file, or a recorded file.

In this step, it should be understood that the mobile terminal is currently in a scenario of satisfying audio output, which means that the mobile terminal will output audio or is outputting audio. In the embodiment of the present disclosure, the mobile terminal drives the screen to vibrate and make a sound by controlling the vibration unit. Therefore, in some embodiments of the present disclosure, the mobile terminal may control at least one of the first vibration unit and the second vibration unit to vibrate according to the first folding state.

In this embodiment, the screen of the mobile terminal includes a first screen area provided with a first vibration unit, and a second screen area provided with a second vibration unit; and the audio output method includes: detecting a first folding state of the first screen area relative to the second screen area, and controlling working states of the first vibration unit and the second vibration unit according to the first folding state in a scenario that audio output is satisfied, to drive the screen to vibrate and make a sound. It can be seen that the vibration unit can directly drive the screen to vibrate and make a sound according to the present disclosure. Therefore, compared with related art, the present disclosure can avoid the problem of low screen-to-body ratio caused by the provision of a sound generating device on a mobile terminal, with no need to provide a sound generating device such as a loudspeaker on the mobile terminal, thereby improving the screen-to-body ratio of the mobile terminal.

In the embodiments of the present disclosure, the first vibration unit is primarily used to drive the first screen area to vibrate and make a sound, and the second vibration unit is primarily used to drive the second screen area to vibrate and make a sound. Therefore, the mobile terminal may infer a screen area concerned (or used) by a user according to the detected first folding state of the first screen area relative to the second screen area, and control the vibration of a vibration unit provided on the screen area concerned (or used) by the user, to drive the screen area concerned (or used) by the user to vibrate and make a sound, thereby improving the sound generating effect.

Alternatively, the controlling working states of the first vibration unit and the second vibration unit according to the first folding state includes:

controlling the first vibration unit and the second vibration unit to vibrate in the case of detecting that the first screen area doesn't fold relative to the second screen area; and controlling a first target vibration unit to vibrate and controlling a second target vibration unit to be stationary in the case of detecting that the first screen area folds relative to the second screen area;

where the first target vibration unit is the first vibration unit and the second target vibration unit is the second vibration unit; or the first target vibration unit is the second vibration unit and the second target vibration unit is the first vibration unit.

In this embodiment, in the case of detecting that the first screen area doesn't fold relative to the second screen area, it means that the user is concerned about both the first screen area and the second screen area at the same time. Therefore, the vibration of the first vibration unit and the second vibration unit may be controlled to drive the screen to vibrate and make a sound, thus enhancing the audio output effect, that is, the sound generating effect.

It should be noted that if the mobile terminal is currently in a state of waiting to output audio, which means that the first target vibration unit and the second target vibration unit are currently in a stationary state, controlling the vibration of the first vibration unit and the second vibration unit may be understood as: controlling the first vibration unit and the second vibration unit to switch from a stationary state to a vibrating state.

If the mobile terminal is currently in a state of outputting audio, which means that the first target vibration unit and the second target vibration unit are currently in a vibrating state, controlling the vibration of the first vibration unit and the second vibration unit may be understood as: controlling the first vibration unit and the second vibration unit to maintain a vibrating state, and controlling the second target vibration unit to switch from a vibrating state to a stationary state.

In the case of detecting that the first screen area folds relative to the second screen area, it means that the user only is concerned about the first screen area or the second screen area. Therefore, a vibration unit provided on the screen area that the user is not concerned about may be controlled to be stationary, and a vibration unit provided on the screen area that the user is concerned about may be controlled to vibrate, thereby reducing the power consumption of the mobile terminal while ensuring the sound generating effect.

It should be noted that if the mobile terminal is currently in a state of waiting to output audio, which means that the first target vibration unit and the second target vibration unit are currently in a stationary state, controlling a first target vibration unit to vibrate and controlling a second target vibration unit to be stationary may be understood as: controlling the first target vibration unit to switch from a stationary state to a vibrating state, and controlling the second target vibration unit to maintain a stationary state.

If the mobile terminal is currently in a state of outputting audio, which means that the first target vibration unit and the second target vibration unit are currently in a vibrating state, controlling a first target vibration unit to vibrate and controlling a second target vibration unit to be stationary may be understood as: controlling the first target vibration unit to maintain a vibrating state, and controlling the second target vibration unit to switch from a vibrating state to a stationary state.

The specific presentation forms of the first target vibration unit and the second target vibration unit are described below.

In a practical application, in a scenario that the first screen area folds relative to the second screen area, the first screen area may fold in a clockwise direction or in an anti-clockwise direction relative to the second screen area.

In the embodiments of the present disclosure, if the first screen area doesn't fold relative to the second screen area, it may be considered that the user is concerned about both the first screen area and the second screen area concurrently. In this case, it is not difficult to understand that the folding of the first screen area in a different direction relative to the second screen area will lead to a different result of a screen area that the user is concerned about inferred by the mobile terminal.

In some implementations of the present disclosure, if the first screen area folds in a clockwise direction relative to the second screen area, which means that the first screen area will cover a part or all of the second screen area, it can be inferred that the user is concerned about the first screen area. For that reason, in this application scenario, it can be determined that the first target vibration unit is the first vibration unit and the second target vibration unit is the second vibration unit.

If the first screen area folds in an anti-clockwise direction relative to the second screen area, which means that the second screen area will cover a part or all of the first screen area, it can be inferred that the user is concerned about the second screen area. For that reason, in this application scenario, it can be determined that the first target vibration unit is the second vibration unit, and the second target vibration unit is the first vibration unit.

It should be noted that in the embodiments of the present disclosure, the screen may be a single-sided screen or a double-sided screen, which can be determined according to an actual need, which is not limited in the embodiments of the present disclosure.

In one embodiment, the mobile terminal may determine a first folding state between a first screen area and a second screen area based on a comparison result of a first folding angle and a preset angle of the first screen area relative to the second screen area.

It should be noted that the first folding angle of the first screen area relative to the second screen area may be understood as: an absolute value of a change in a first angle formed between the first screen area and the second screen area during a detection relative to an initial angle formed between the first screen area and the second screen area, rather than an angle formed between the first screen area and the second screen area, where the initial angle may be but is not limited to 180 degrees.

Optionally, the detecting a first folding state of the first screen area relative to the second screen area includes:
  detecting a first folding angle of the first screen area relative to the second screen area;
  where if the first folding angle is less than a preset angle, it is determined that the first screen area doesn't fold relative to the second screen area; if the first folding angle is greater than or equal to the preset angle, it is determined that the first screen area folds relative to the second screen area.

In this embodiment, the preset angle may be set according to an actual need. For example, the preset angle may be but it is not limited to 90 degrees.

It is sure that in another embodiment, the mobile terminal may determine the first folding state of the first screen area relative to the second screen area based on whether a capacitance is formed between the first screen area and the second screen area. For example: if no capacitance is formed between the first screen area and the second screen area, it is determined that the first screen area doesn't fold relative to the second screen area; if a capacitance is formed between the first screen area and the second screen area, it is determined that the first screen area folds relative to the second screen area.

For the embodiment of determining a folding state between a first screen area and a second screen area based on a comparison result of a first folding angle of the first screen area relative to the second screen area and a preset angle, optionally, during an audio output process, the controlling a second target vibration unit to be stationary includes:
  weakening a vibration intensity of the second target vibration unit according to the first folding angle during a process that the first folding angle increases.

The audio output process may include any one of but is not limited to the following: a multimedia file playing process; and a call process.

It can be seen from the foregoing that during the audio output process, the controlling a second target vibration unit to be stationary may be understood as: controlling the second target vibration unit to switch from a vibrating state to a stationary state. In this application scenario, in a process of controlling the second target vibration unit to stop vibrating, a vibration intensity of the second target vibration unit may be controlled to decrease as the first folding angle increases. In this way, the flexibility of adjusting a state of the vibration unit can be enhanced; in addition, with a change in the vibration intensity of the second target vibration unit, the vibrating sound intensity of the screen area where the second target vibration unit is located will change, thus making the sound more spatial and improving the sound generating effect.

In some implementations of the present disclosure, the mobile terminal may pre-set a corresponding relationship between the first folding angle and the vibration intensity of the second target vibration unit, so that the vibration intensity of the second target vibration unit can be reduced to a vibration intensity corresponding to a current first folding angle during a process that the first folding angle increases.

Further, the controlling a first target vibration unit to vibrate includes:

increasing a vibration intensity of the first target vibration unit according to the first folding angle during a process that the first folding angle increases.

In this application scenario, the vibration intensity of the first target vibration unit may also be controlled to gradually increase while the vibration intensity of the second target vibration unit is controlled to gradually weaken. In this way, the flexibility of adjusting a state of the vibration unit can further be enhanced; in addition, with a change in the vibration intensity of the target vibration unit, the vibrating sound intensity of the screen area where the target vibration unit is located will change, thus making the sound more spatial and improving the sound generating effect.

In some implementations of the present disclosure, with respect to the first target vibration unit, the mobile terminal may pre-set a corresponding relationship between the first folding angle and the vibration intensity of the first target vibration unit, so that the vibration intensity of the first target vibration unit can be increased to a vibration intensity corresponding to a current first folding angle during a process that the first folding angle increases.

Optionally, after the controlling a second target vibration unit to be stationary, the method further includes:

controlling the second target vibration unit to vibrate in the case of detecting that the first folding angle is reduced to less than the preset angle.

In this application scenario, after controlling the second target vibration unit to be stationary, the mobile terminal may control the second target vibration unit to switch from a stationary state to a vibrating state in the case of detecting that the first folding angle is reduced to less than the preset angle again, to improve an audio output effect.

Further, the controlling the second target vibration unit to vibrate includes:

increasing a vibration intensity of the second target vibration unit according to the first folding angle during a process that the first folding angle decreases.

In some implementations of the present disclosure, the increasing a vibration intensity of the second target vibration unit according to the first folding angle may include: increasing the vibration intensity of the second target vibration unit and reducing a vibration intensity of the first target vibration unit according to the first folding angle.

It should be noted that, for an implementation principle of controlling the vibration intensity of the vibration unit to change with the change of the first folding angle, reference may be made to the foregoing related description, which is no longer repeated herein.

An application scenario in which the user folds the screen once, thus dividing the screen into a first screen area and a second screen area is mainly described as an example in the foregoing. However, in a practical application, a user may fold a screen many times. Therefore, in addition to focusing on the folding state of the first screen area relative to the second screen area, we may further focus on a folding state of every screen area.

The following takes an example of focusing on a folding state of the second screen area.

Optionally, the second screen area includes a first sub-screen area and a second sub-screen area provided with the second vibration unit, where the first screen area, the first sub-screen area, and the second sub-screen area are connected in sequence;

the detecting a first folding state of the first screen area relative to the second screen area includes:

detecting a first folding state of the first screen area relative to the first sub-screen area.

For easy understanding, refer to FIG. 1 as well. As shown in FIG. 1, a second screen area 12 may be divided into: a first sub-screen area 121 and a second sub-screen area 122, where the second sub-screen area 122 is provided with a second vibration unit 22. In FIG. 1, a first screen area 11, the first sub-screen area 121, and the second sub-screen area are connected in sequence.

In this embodiment, for an implementation manner of "detecting a first folding state of the first screen area relative to the first sub-screen area", reference may be made to the foregoing description of "detecting a first folding state of the first screen area relative to the second screen area", which is no longer repeated herein.

In an implementation manner, optionally, after the detecting a first folding state of the first screen area relative to the first sub-screen area, before the controlling working states of the first vibration unit and the second vibration unit according to the first folding state, the method further includes:

detecting a second folding state of the second sub-screen area relative to the first sub-screen area; and the controlling working states of the first vibration unit and the second vibration unit according to the first folding state includes:

controlling working states of the first vibration unit and the second vibration unit according to the first folding state and the second folding state.

In this embodiment, for an implementation manner of "detecting a second folding state of the second sub-screen area relative to the first sub-screen area", reference may be made to the foregoing description of "detecting a first folding state of the first screen area relative to the second screen area", which is no longer repeated herein.

In this embodiment, the working states of the first vibration unit and the second vibration unit need to be determined in combination with the first folding state and the second folding state, which is described specifically as follows:

Manner 1

Optionally, the controlling working states of the first vibration unit and the second vibration unit according to the first folding state and the second folding state may include:

controlling the first vibration unit and the second vibration unit to vibrate in the case of detecting that the first screen area folds relative to the first sub-screen area, and the second sub-screen area folds relative to the first sub-screen area.

Further, vibration information of the first vibration unit matches left audio channel information, and vibration information of the second vibration unit matches right audio channel information; or, vibration information of the first vibration unit matches right audio channel information, and vibration information of the second vibration unit matches left audio channel information. In this way, the screen can vibrate to output stereo, improving the sound generating effect.

In some implementations of the present disclosure, in the case that the mobile terminal is in a state of outputting audio, before the controlling working states of the first vibration unit and the second vibration unit according to the first folding state and the second folding state, the method further includes:

detecting a working state of the first sub-screen area;
the controlling the first vibration unit and the second vibration unit to vibrate in the case of detecting that the first screen area folds relative to the first sub-screen area, and the second sub-screen area folds relative to the first sub-screen area includes:
controlling the first vibration unit and the second vibration unit to vibrate in the case of detecting that the first screen area folds relative to the first sub-screen area, the second sub-screen area folds relative to the first sub-screen area, and the first sub-screen area is in use.

In this application scenario, if the first sub-screen area is not in use, and it is detected that the first screen area folds relative to the first sub-screen area, and the second sub-screen area folds relative to the first sub-screen area, the first vibration unit and the second vibration unit may be controlled to be stationary.

In the case that the mobile terminal is in a state of satisfying audio output, the mobile terminal may not judge a use state of the first sub-screen area. That is, the use state of the first sub-screen area may not affect the control of the vibration unit by the mobile terminal.

Manner 2

Optionally, the controlling working states of the first vibration unit and the second vibration unit according to the first folding state and the second folding state may include:

controlling the first target vibration unit to vibrate, and controlling the second target vibration unit to be stationary in the case of detecting that the first screen area folds relative to the first sub-screen area but the second sub-screen area doesn't fold relative to the first sub-screen area, or in the case of detecting that the first screen area doesn't fold relative to the first sub-screen area but the second sub-screen area folds relative to the first sub-screen area,
where the first target vibration unit is the first vibration unit and the second target vibration unit is the second vibration unit; or the first target vibration unit is the second vibration unit and the second target vibration unit is the first vibration unit.

It should be noted that this manner is the same as the implementation manner of "controlling a first target vibration unit to vibrate and controlling a second target vibration unit to be stationary in the case of detecting that the first screen area folds relative to the second screen area". For details, reference may be made to the foregoing related description, which is no longer repeated herein.

Manner 3

Optionally, the controlling working states of the first vibration unit and the second vibration unit according to the first folding state and the second folding state may include:

controlling the first vibration unit and the second vibration unit to vibrate in the case of detecting that the first screen area doesn't fold relative to the first sub-screen area, and the second sub-screen area doesn't fold relative to the first sub-screen area.

It should be noted that this manner is the same as the implementation manner of "controlling the first vibration unit and the second vibration unit to vibrate in the case of detecting that the first screen area doesn't fold relative to the second screen area". For details, reference may be made to the foregoing related description, which is no longer repeated herein.

Manner 4

Optionally, the controlling working states of the first vibration unit and the second vibration unit according to the first folding state and the second folding state may include:

controlling the first vibration unit and the second vibration unit to be stationary in the case of detecting that the first screen area folds relative to the first sub-screen area, and the second sub-screen area folds relative to the first sub-screen area.

In this manner, in the case of detecting that the first screen area folds relative to the first sub-screen area, and the second sub-screen area folds relative to the first sub-screen area, the mobile terminal may control the first vibration unit and the second vibration unit to be stationary, to stop audio output, which provides a manner for controlling a vibration unit to be stationary, thereby improving the flexibility of audio output control.

Exemplarily, in a process of playing music, a user may directly trigger a mobile terminal to stop playing music by folding a first screen area and a second sub-screen area, which can in comparison simplify operations that the user needs to trigger the mobile terminal to display a music playing interface, and then click the music play/pause control in the play interface to trigger the mobile terminal to stop playing music.

It should be noted that, in a practical application, Manner 1 and Manner 4 may be implemented in combination. In some embodiments, the mobile terminal may be controlled to execute Manner 1 and Manner 4 based on a first folding angle and/or a second folding angle.

Exemplarily, in the case of detecting that the first folding angle and/or the second folding angle are greater than the foregoing preset angle and less than the first angle, the mobile terminal may perform Manner 4 to control the first vibration unit and the second vibration unit to be stationary; and in the case of detecting that the first folding angle and/or the second folding angle are greater than the foregoing first angle, the mobile terminal may perform Manner 1 to control the first vibration unit and the second vibration unit to vibrate, but it is not limited to that.

It should be noted that multiple optional implementations described in this embodiments of the present disclosure may be implemented in combination with each other, or may be separately implemented. This is not limited in this embodiment of the present disclosure.

Figure 3:
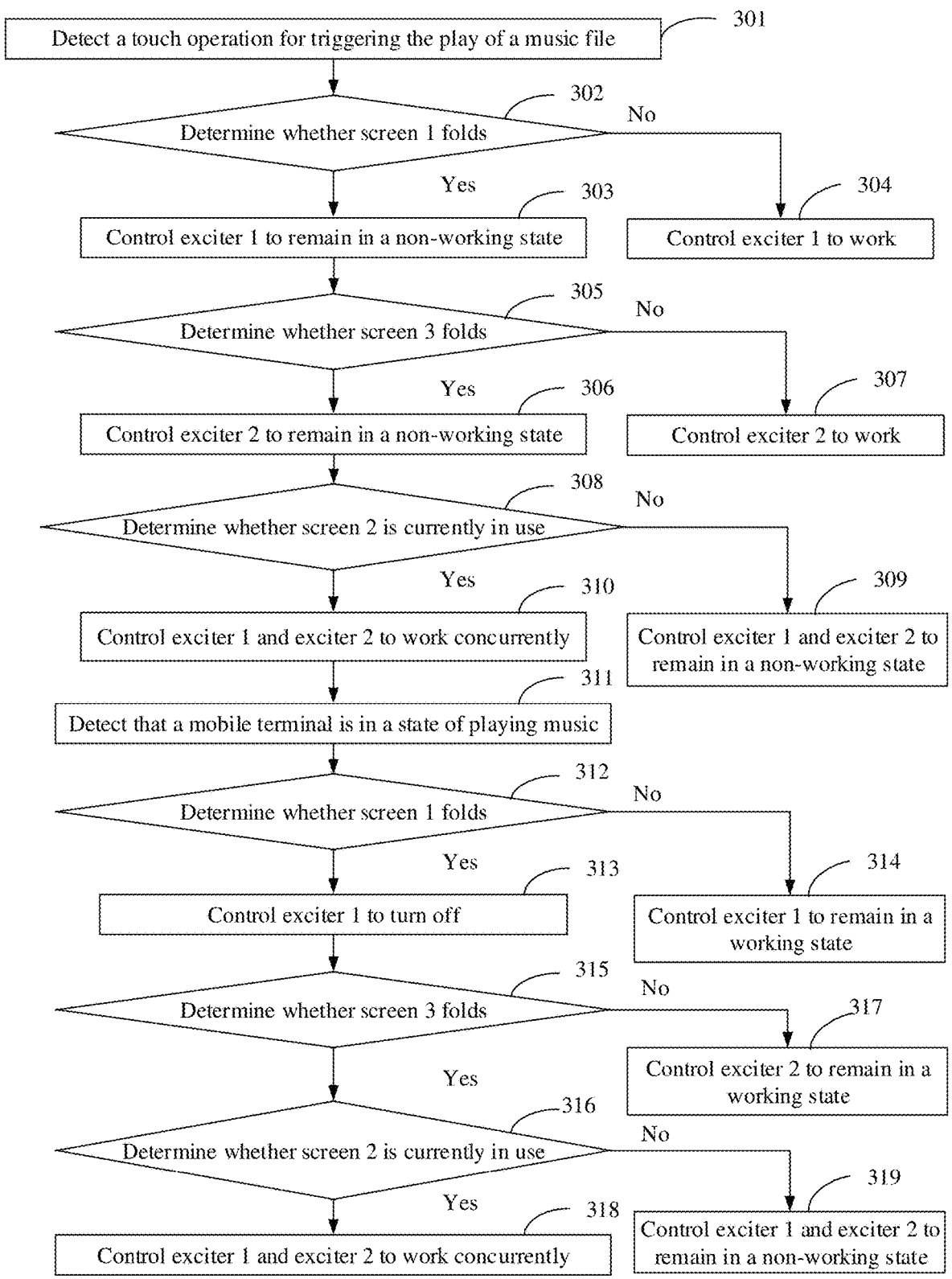
FIG. 3 is a flowchart 2 of an audio output method according to an embodiment of the present disclosure.

For easy understanding, refer to FIG. 3 as well. This embodiment provides a solution for synchronization of sound generating and screen folding on a flexible screen based on the full-screen acoustic technology. For a design of the flexible screen, reference may be made to FIG. 1. A vibration unit for driving the whole screen to make a sound, such as an exciter, is mounted on each of two ends of the flexible screen. As shown in FIG. 1, the flexible screen is divided into three portions: a first screen area 11, a first sub-screen area 121 and a second sub-screen area 123. The first screen area 11 is provided with a first vibration unit 21, and the second sub-screen area is provided with a second vibration unit 22.

For easy description, the first screen area 11 is referred to as screen 1, the first sub-screen area 121 is referred to as screen 2, and the second sub-screen area 123 is referred to as screen 3. In addition, the first vibration unit 21 is referred to as exciter 1, and the second vibration unit 22 is referred to as exciter 2.

A system sound of screen 1 is controlled by exciter 1, and a sound of screen 3 is controlled by exciter 2. Screen 2 is located in the center, and its sound needs to be driven by both exciters 1 and 2. In this way, when the screen 2 is working, the two exciters play sounds in a left audio channel and a right audio channel respectively, which can achieve a stereo effect.

As shown in FIG. 3, the audio output method according to this embodiment may include the following steps:

Step 301. Detect a touch operation for triggering the play of a music file.

In other words, the mobile terminal is in a state of preparing to play music.

Step 302. Judge whether screen 1 folds.

If it is confirmed that screen 1 folds and is not used, proceed to step 303; otherwise, proceed to step 304.

Step 303. Control exciter 1 to remain in a non-working state.

Afterward, proceed to step 305.

Step 304. Control exciter 1 to work.

Step 305. Judge whether screen 3 folds.

If it is confirmed that screen 3 folds, proceed to step 306; otherwise, proceed to step 307.

Step 306. Control exciter 2 to remain in a non-working state.

Afterward, proceed to step 308.

Step 307. Control exciter 2 to work.

Step 308. Judge whether screen 2 is currently in use.

That is to say, step 308 is mainly used to confirm a current working state of screen 2 after the state of screen 1 and screen 3 are determined. In some implementations of the present disclosure, whether screen 2 is in use may be judged according to whether screen 2 is in a screen-on state; if it is in a screen-on state, it is determined that screen 2 is in use; otherwise, it is determined that screen 2 is not in use, but it is not limited to that.

If it is that screen 2 is not in use, proceed to step 309; otherwise, proceed to step 310.

Step 309. Control exciter 1 and exciter 2 to remain in a non-working state.

Step 310. Control exciter 1 and exciter 2 to work concurrently.

Step 311. Detect that the mobile terminal is in a state of playing music.

At this time, the working states of screen 1, screen 2, and screen 3 have been confirmed, and the working states of exciter 1 and exciter 2 have been confirmed. During a music playing process, a required exciter may further be turned on or off according to the previous judged state. For example, if a screen folds during a music playing process, it is required to rejudge a folding angle and direction of the screen, and then conduct progressive on-off switching on an exciter.

Step 312. Judge whether screen 1 folds.

If it is confirmed that screen 1 folds, proceed to step 313; otherwise, proceed to step 314.

Step 313. Control exciter 1 to turn off.

In some implementations of the present disclosure, when screen 1 folds, confirm its folding angle and determine whether screen 1 needs to be used continuously; if screen 1 folds and is not used, turn off exciter 1, but the turning-off process needs to be conducted progressively, and sound decreases with the increase of the folding angle; if screen 1 needs to be turned on for use again, it is required to turn on exciter 1 for use again, and sound of exciter 1 needs to become louder with the decrease of the folding angle.

Afterward, proceed to step 315.

Step 314. Control exciter 1 to remain in a working state.

Step 315. Judge whether screen 3 folds.

If it is confirmed that screen 3 folds, proceed to step 316; otherwise, proceed to step 317.

Step 316. Judge whether screen 2 is currently in use.

If it is that screen 2 is not in use, proceed to step 318; otherwise, proceed to step 319.

Step 317. Control exciter 2 to remain in a working state.

Step 318. Control exciter 2 to be turned off.

In some implementations of the present disclosure, when screen 3 folds, confirm its folding angle and determine whether screen 3 needs to be used continuously; if screen 3 folds and is not used, turn off exciter 2, but the turning-off process needs to be conducted progressively, and sound decreases with the increase of the folding angle; if screen 3 needs to be turned on for use again, it is required to turn on exciter 2 for use again, and sound of exciter 2 needs to become louder with the decrease of the folding angle.

Step 319. Control exciter 1 and exciter 2 to work concurrently.

In some implementations of the present disclosure, exciters 1 and 2 are set as a left audio channel and a right audio channel for an acoustic signal respectively to maintain a stereo effect.

The audio output method according to the embodiment of the present disclosure may include at least the following improvements:

attach a vibration unit for driving a screen to vibrate to each of two ends of the flexible screen, such as an exciter, to drive the screen frame to vibrate and make a sound by using the full-screen acoustic technology; when the left screen (equivalent to the foregoing first screen area) folds to the back, use the exciter on the right to make a sound; when the right screen (equivalent to the foregoing second screen area) folds to the back, use the exciter on the left to make a sound; when both the left screen and right screen fold to the back and the middle screen is used, use the exciters on both the left and right sides to make a sound, to ensure sound balance in the middle portion; and during a folding process, the sound may also be dynamically changed to make the sound spatial; with a change in the folding angle, the sound generated by the exciter folding to the back gradually decreases as the folding angle becomes larger while the sound generated by the exciter used at the front end becomes louder as the folding angle becomes larger, making the user's listening experience change with a change of the screen folding, making the sound more spatial, and achieving a better user experience.

The audio output method according to the embodiment of the present disclosure may include at least the following beneficial effects:

the embodiments of the present disclosure can achieve arbitrary folding of a flexible screen without being affected by a cavity for a sound generating device such as a loudspeaker; in addition, a sound can be made to work on a screen currently concerned without being affected by folding of a screen, and a stereo effect and synchronization of an action and sound generating can be achieved as well, making the user experience better.

Figure 4:
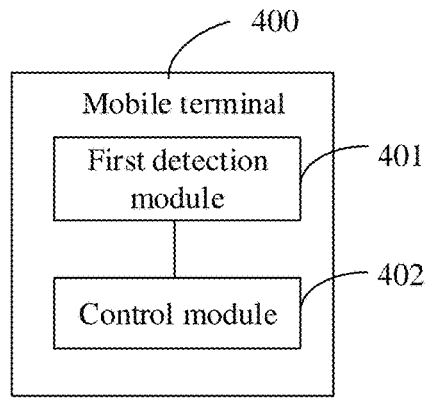
FIG. 4 is a structural diagram 1 of a mobile terminal according to an embodiment of the present disclosure.

Refer to FIG. 4, which is a structural diagram 1 of a mobile terminal according to an embodiment of the present disclosure. A mobile terminal 400 includes a collapsible screen, where the collapsible screen includes a first screen area provided with a first vibration unit, and a second screen area provided with a second vibration unit. As shown in FIG. 4, the mobile terminal 400 includes:

a first detection module 401, configured to detect a first folding state of the first screen area relative to the second screen area; and a control module 402, configured to control working states of the first vibration unit and the second vibration unit according to the first folding state in a scenario that audio output is satisfied.

On the basis of FIG. 4, the following describes the modules further included in the mobile terminal 400 and an unit included in each module.

Optionally, the control module 402 may be configured to:

control the first vibration unit and the second vibration unit to vibrate in the case of detecting that the first screen area doesn't fold relative to the second screen area; and control a first target vibration unit to vibrate and control a second target vibration unit to be stationary in the case of detecting that the first screen area folds relative to the second screen area;

where the first target vibration unit is the first vibration unit and the second target vibration unit is the second vibration unit; or the first target vibration unit is the second vibration unit and the second target vibration unit is the first vibration unit.

Optionally, the first detection module 401 may be configured to:

detect a first folding angle of the first screen area relative to the second screen area;

where if the first folding angle is less than a preset angle, it is determined that the first screen area doesn't fold relative to the second screen area; if the first folding angle is greater than or equal to the preset angle, it is determined that the first screen area folds relative to the second screen area.

Optionally, during an audio output process, the control module 402 may be configured to:

weaken a vibration intensity of the second target vibration unit according to the first folding angle during a process that the first folding angle increases.

Optionally, the control module 402 may be configured to:

increase a vibration intensity of the first target vibration unit according to the first folding angle during a process that the first folding angle increases.

Optionally, during an audio output process, the control module 402 is further configured to:

control the second target vibration unit to vibrate after the second target vibration unit is controlled to be stationary and in the case of detecting that the first folding angle is reduced to less than the preset angle.

Optionally, the control module 402 may be configured to:

increase a vibration intensity of the second target vibration unit according to the first folding angle during a process that the first folding angle decreases.

Optionally, the second screen area includes a first sub-screen area and a second sub-screen area provided with the second vibration unit, where the first screen area, the first sub-screen area, and the second sub-screen area are connected in sequence.

The first detection module 401 may be configured to:

detect a first folding state of the first screen area relative to the first sub-screen area.

Optionally, the terminal 400 further includes:

a second detection module, configured to, after the first folding state of the first screen area relative to the first sub-screen area is detected, detect a second folding state of the second sub-screen area relative to the first sub-screen area before the working states of the first vibration unit and the second vibration unit are controlled according to the first folding state.

The control module 402 may be configured to:

control working states of the first vibration unit and the second vibration unit according to the first folding state and the second folding state.

Optionally, the control module 402 may be configured to:

control the first vibration unit and the second vibration unit to vibrate in the case of detecting that the first screen area folds relative to the first sub-screen area, and the second sub-screen area folds relative to the first sub-screen area.

Optionally, vibration information of the first vibration unit matches left audio channel information, and vibration information of the second vibration unit matches right audio channel information; or, vibration information of the first vibration unit matches right audio channel information, and vibration information of the second vibration unit matches left audio channel information.

Optionally, the first vibration unit and the second vibration unit are symmetrically arranged on the screen.

In this embodiment, the mobile terminal includes a first screen area provided with a first vibration unit, and a second screen area provided with a second vibration unit; and the audio output method includes: detecting a first folding state of the first screen area relative to the second screen area, and controlling working states of the first vibration unit and the second vibration unit according to the first folding state in a scenario that audio output is satisfied, to drive the screen to vibrate and make a sound. It can be seen that the vibration unit can directly drive the screen to vibrate and make a sound according to the present disclosure. Therefore, compared with related art, the present disclosure can avoid the problem of low screen-to-body ratio caused by the provision of a sound generating device on a mobile terminal, with no need to provide a sound generating device such as a loudspeaker on the mobile terminal, thereby improving the screen-to-body ratio of the mobile terminal.

It should be noted that the mobile terminal 400 can implement each process in the method embodiment of the present disclosure, and achieve same beneficial effects. To avoid repetition, details are not described herein again.

Figure 5:
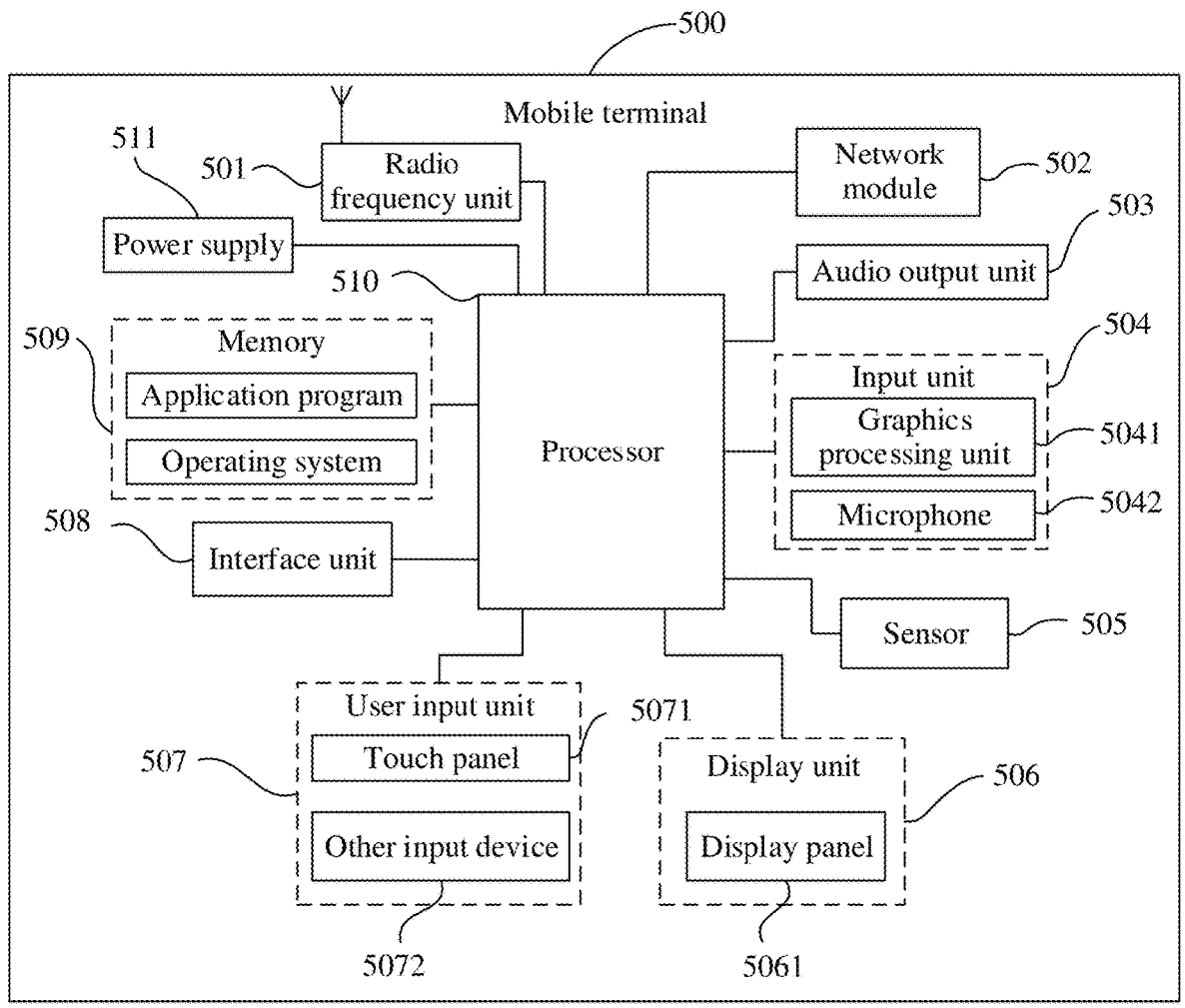
FIG. 5 is a structural diagram 2 of a mobile terminal according to an embodiment of the present disclosure.

Refer to FIG. 5, which is a structural diagram 2 of a mobile terminal according to an embodiment of the present disclosure. The mobile terminal may be a mobile terminal for implementing the embodiments of the present disclosure. A mobile terminal 500 includes a collapsible screen, where the collapsible screen includes a first screen area provided with a first vibration unit, and a second screen area provided with a second vibration unit. As shown in FIG. 5, the mobile terminal 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that a structure of the mobile terminal shown in FIG. 5 does not constitute a limitation on the mobile terminal, and the mobile terminal may include more or fewer components than those shown in the figure, or combine some components, or have different component arrangements. In this embodiment of the present disclosure, the mobile terminal includes, but is not limited to, a mobile phone, a tablet computer, a laptop computer, a palmtop computer, an in-vehicle terminal, a wearable device, a pedometer, and the like.

The processor 510 is configured to:
detect a first folding state of the first screen area relative to the second screen area; and
control working states of the first vibration unit and the second vibration unit according to the first folding state in a scenario that audio output is satisfied.

Optionally, the processor 510 is further configured to:
control the first vibration unit and the second vibration unit to vibrate in the case of detecting that the first screen area doesn't fold relative to the second screen area; and/or
control a first target vibration unit to vibrate and control a second target vibration unit to be stationary in the case of detecting that the first screen area folds relative to the second screen area;
where the first target vibration unit is the first vibration unit and the second target vibration unit is the second vibration unit; or the first target vibration unit is the second vibration unit and the second target vibration unit is the first vibration unit.

Optionally, the processor 510 is further configured to:
detect a first folding angle of the first screen area relative to the second screen area;
where if the first folding angle is less than a preset angle, it is determined that the first screen area doesn't fold relative to the second screen area; if the first folding angle is greater than or equal to the preset angle, it is determined that the first screen area folds relative to the second screen area.

Optionally, during an audio output process, the processor 510 is further configured to:
weaken a vibration intensity of the second target vibration unit according to the first folding angle during a process that the first folding angle increases.

Optionally, the processor 510 is further configured to:
increase a vibration intensity of the first target vibration unit according to the first folding angle during a process that the first folding angle increases.

Optionally, during an audio output process, the processor 510 is further configured to:
control the second target vibration unit to vibrate after the second target vibration unit is controlled to be stationary and in the case of detecting that the first folding angle is reduced to less than the preset angle.

Optionally, the processor 510 is further configured to:
increase a vibration intensity of the second target vibration unit according to the first folding angle during a process that the first folding angle decreases.

Optionally, the second screen area includes a first sub-screen area and a second sub-screen area provided with the second vibration unit, where the first screen area, the first sub-screen area, and the second sub-screen area are connected in sequence; the processor 510 is further configured to:
detect a first folding state of the first screen area relative to the first sub-screen area.

Optionally, the processor 510 is further configured to:
detect a second folding state of the second sub-screen area relative to the first sub-screen area; and
control working states of the first vibration unit and the second vibration unit according to the first folding state and the second folding state.

Optionally, the processor 510 is further configured to:
control the first vibration unit and the second vibration unit to vibrate in the case of detecting that the first screen area folds relative to the first sub-screen area, and the second sub-screen area folds relative to the first sub-screen area.

Optionally, vibration information of the first vibration unit matches left audio channel information, and vibration information of the second vibration unit matches right audio channel information; or, vibration information of the first vibration unit matches right audio channel information, and vibration information of the second vibration unit matches left audio channel information.

Optionally, the first vibration unit and the second vibration unit are symmetrically arranged on the screen.

In this embodiment, the mobile terminal includes a first screen area provided with a first vibration unit, and a second screen area provided with a second vibration unit; and the audio output method includes: detecting a first folding state of the first screen area relative to the second screen area, and controlling working states of the first vibration unit and the second vibration unit according to the first folding state in a scenario that audio output is satisfied, to drive the screen to vibrate and make a sound. It can be seen that the vibration unit can directly drive the screen to vibrate and make a sound according to the present disclosure. Therefore, compared with related art, the present disclosure can avoid the problem of low screen-to-body ratio caused by the provision of a sound generating device on a mobile terminal, with no need to provide a sound generating device such as a loudspeaker on the mobile terminal, thereby improving the screen-to-body ratio of the mobile terminal.

It should be noted that the mobile terminal 500 in this embodiment can implement each process in the method embodiments in the embodiments of the present disclosure, and achieve same beneficial effects. To avoid repetition, details are not described herein again.

It should be understood that in this embodiment of the present disclosure, the radio frequency unit 501 may be configured to receive and send signals in a process of receiving and sending information or calling. For example, after receiving downlink data from a base station, the radio frequency unit 501 sends the downlink data to the processor 510 for processing; and sends uplink data to the base station. Generally, the radio frequency unit 501 includes, but is not limited to, an antenna, at least one amplifier, a transceiver, a coupler, a low noise amplifier, a duplexer, and the like. In addition, the radio frequency unit 501 may further communicate with a network and another device by using a wireless communication system.

The mobile terminal provides wireless broadband Internet access for a user by using a network module 502, for example, helping the user send and receive an email, browse a web page, and access streaming media.

The audio output unit 503 may convert audio data received by the radio frequency unit 501 or the network module 502 or stored in the memory 509 into an audio signal and output as sound. Moreover, the audio output unit 503 may further provide audio output (for example, call signal receiving sound and message receiving sound) related to a specific function executed by the mobile terminal 500. The audio output unit 503 includes a speaker, a buzzer, a telephone receiver, and the like.

The input unit 504 is configured to receive an acoustic signal or a video signal. The input unit 504 may include a graphics processing unit (GPU) 5041 and a microphone 5042. The graphics processing unit 5041 processes image data of a static picture or a video obtained by an image capture apparatus (for example, a camera) in a video capture mode or image capture mode. A processed image frame may be displayed on the display unit 506. The image frame processed by the graphics processing unit 5041 may be stored in the memory 509 (or another storage medium) or sent via the radio frequency unit 501 or the network module 502. The microphone 5042 may receive sound and can process such sound into audio data. The processed audio data may be converted, in a call mode, into a format that can be sent by using the radio frequency unit 501 to a mobile communication base station, for outputting.

The mobile terminal 500 further includes at least one sensor 505, such as a light sensor, a motion sensor, and another sensor. For example, the light sensor includes an ambient light sensor and a proximity sensor. The ambient light sensor may adjust luminance of the display panel 5061 based on brightness of ambient light, and the proximity sensor may disable the display panel 5061 and/or backlight when the mobile terminal 500 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a mobile terminal gesture (for example, horizontal and vertical screen switching, a related game, or magnetometer posture calibration), a function related to vibration recognition (for example, a pedometer or a strike), or the like. The sensor 505 may further include a fingerprint sensor, a pressure sensor, an iris sensor, a molecular sensor, a gyroscope, a barometer, a hygrometer, a thermometer, an infrared sensor, and the like. This is not described herein.

The display unit 506 is configured to display information entered by the user or information provided for the user. The display unit 506 may include a display panel 5061, and the display panel 5061 may be configured in a form of liquid crystal display (LCD), organic light-emitting diode (OLED), or the like.

The user input unit 507 may be configured to receive input digit or character information and generate key signal input related to user setting and function control of the mobile terminal. For example, the user input unit 507 includes a touch panel 5071 and another input device 5072. The touch panel 5071, also referred to as a touchscreen, may collect a touch operation performed by the user on or near the touch panel 5071 (for example, an operation performed by the user on or near the touch panel 5071 by using any suitable object or accessory such as a finger or a stylus). The touch panel 5071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 510, and can receive and execute a command sent by the processor 510. In addition, the touch panel 5071 may be implemented by using a plurality of types such as a resistive type, a capacitive type, an infrared ray, and a surface acoustic wave. The user input unit 507 may further include another input device 5072 in addition to the touch panel 5071. For example, the another input device 5072 may include, but is not limited to, a physical keyboard, function keys (such as a volume control key and a switch key), a trackball, a mouse, and a joystick. Details are not described herein.

Further, the touch panel 5071 can cover the display panel 5061. When detecting a touch operation on or near the touch panel 5071, the touch panel 5071 transmits the touch operation to the processor 510 to determine a type of a touch event. Then, the processor 510 provides corresponding visual output on the display panel 5061 based on the type of the touch event. In FIG. 5, the touch panel 5071 and the display panel 5061 are used as two independent components to implement input and output functions of the mobile terminal. However, in some embodiments, the touch panel 5071 and the display panel 5061 may be integrated to implement the input and output functions of the mobile terminal. This is not specifically limited herein.

The interface unit 508 is an interface connecting an external apparatus to the mobile terminal 500. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 508 may be configured to receive input (such as data information and power) from the external apparatus and transmit the received input to one or more units in the mobile terminal 500, or may be configured to transmit data between the mobile terminal 500 and the external apparatus.

The memory 509 may be configured to store a software program and various data. The memory 509 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 509 may include a high-speed random access memory, or may include a non-volatile memory, for example, at least one disk storage device, a flash memory, or another volatile solid-state storage device.

The processor 510 is a control center of the mobile terminal, and is connected to all parts of the entire mobile terminal by using various interfaces and lines, and performs various functions of the mobile terminal and processes data by running or executing the software program and/or the module that are stored in the memory 509 and invoking the data stored in the memory 509, to implement overall monitoring on the mobile terminal. The processor 510 may include one or more processing units. Optionally, the processor 510 may integrate an application processor and a modem processor. The application processor mainly processes an operating system, a user interface, an application program, and the like. The modem processor mainly processes wireless communication. It can be understood that the above-mentioned modem processor may not be integrated in the processor 510.

The mobile terminal 500 may further include a power supply 511 (such as a battery) that supplies power to each component. Optionally, the power supply 511 may be logically connected to the processor 510 by using a power supply management system, to implement functions such as charging, discharging, and power consumption management by using the power supply management system.

In addition, the mobile terminal 500 includes some functional modules not shown, and details are not described herein again.

Optionally, an embodiment of the present disclosure further provides a mobile terminal, including a processor 510, a memory 509, and a computer program that is stored in the memory 509 and that executable on the processor 510.

When the computer program is executed by the processor 510, each process of the foregoing embodiments of the audio output method is implemented, and the same technical effect can be achieved. To avoid repetition, details are not described herein again.

An embodiment of the present disclosure further provides a non-transitory computer readable storage medium, storing a computer program, where when the computer program is executed by the processor, each process of the foregoing embodiments of the audio output method is implemented, and the same technical effects can be achieved. To avoid repetition, details are not described herein again. The non-transitory computer-readable storage medium is, for example, a Read-Only Memory (ROM), a Random Access Memory (RAM) or an optical disc.

It should be noted that in this specification, the terms "comprise", "include", and any other variants thereof are intended to cover non-exclusive inclusion, so that a process, a method, an article, or an apparatus that includes a series of units not only includes these very units, but also includes other units not expressly listed, or also includes units inherent to this process, method, article, or apparatus. In the absence of more restrictions, an unit defined by the statement "including a . . . " does not preclude the presence of other identical units in the process, method, article, or apparatus that includes the unit.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. An audio output method, applied to a mobile terminal, wherein a screen of the mobile terminal comprises a first screen area provided with a first vibration unit, and a second screen area provided with a second vibration unit;
the method comprises:
  detecting a first folding state of the first screen area relative to the second screen area; and
  controlling working states of the first vibration unit and the second vibration unit according to the first folding state in a scenario that audio output is satisfied;
  wherein the controlling working states of the first vibration unit and the second vibration unit according to the first folding state comprises:
    controlling the first vibration unit and the second vibration unit to vibrate in the case of detecting that the first screen area does not fold relative to the second screen area; and
    controlling a first target vibration unit to vibrate and controlling a second target vibration unit to be stationary in the case of detecting that the first screen area folds relative to the second screen area;
  wherein the first target vibration unit is the first vibration unit and the second target vibration unit is the second vibration unit; or the first target vibration unit is the second vibration unit and the second target vibration unit is the first vibration unit.

2. The method according to claim 1, wherein the detecting the first folding state of the first screen area relative to the second screen area comprises:
  detecting a first folding angle of the first screen area relative to the second screen area;
  wherein if the first folding angle is less than a preset angle, it is determined that the first screen area does not fold relative to the second screen area and if the first folding angle is greater than or equal to the preset angle, it is determined that the first screen area folds relative to the second screen area.

3. The method according to claim 2, wherein during an audio output process, the controlling a second target vibration unit to be stationary comprises:
  weakening a vibration intensity of the second target vibration unit according to the first folding angle during a process that the first folding angle increases.

4. The method according to claim 3, wherein the controlling a first target vibration unit to vibrate comprises:
  increasing a vibration intensity of the first target vibration unit according to the first folding angle during a process that the first folding angle increases.

5. The method according to claim 2, wherein during an audio output process, after the controlling a second target vibration unit to be stationary, the method further comprises:
  controlling the second target vibration unit to vibrate in the case of detecting that the first folding angle is reduced to less than the preset angle.

6. The method according to claim 5, wherein the controlling the second target vibration unit to vibrate comprises:
  increasing a vibration intensity of the second target vibration unit according to the first folding angle during a process that the first folding angle decreases.

7. The method according to claim 1, wherein the second screen area comprises a first sub-screen area and a second sub-screen area provided with the second vibration unit, wherein the first screen area, the first sub-screen area, and the second sub-screen area are connected in sequence;
  the detecting the first folding state of the first screen area relative to the second screen area comprises:
    detecting a first folding state of the first screen area relative to the first sub-screen area.

8. The method according to claim 7, wherein after the detecting the first folding state of the first screen area relative to the first sub-screen area, before the controlling working states of the first vibration unit and the second vibration unit according to the first folding state, the method further comprises:
  detecting a second folding state of the second sub-screen area relative to the first sub-screen area; and
  the controlling working states of the first vibration unit and the second vibration unit according to the first folding state comprises:

controlling working states of the first vibration unit and the second vibration unit according to the first folding state and the second folding state.

9. The method according to claim 8, wherein the controlling working states of the first vibration unit and the second vibration unit according to the first folding state and the second folding state comprises:
controlling the first vibration unit and the second vibration unit to vibrate in the case of detecting that the first screen area folds relative to the first sub-screen area, and the second sub-screen area folds relative to the first sub-screen area.

10. The method according to claim 9, wherein
vibration information of the first vibration unit matches left audio channel information, and vibration information of the second vibration unit matches right audio channel information; or
vibration information of the first vibration unit matches right audio channel information, and vibration information of the second vibration unit matches left audio channel information.

11. The method according to claim 1, wherein the first vibration unit and the second vibration unit are symmetrically arranged on the screen.

12. A mobile terminal, comprising a processor, a memory, and a computer program that is stored in the memory and executable on the processor, wherein a screen of the mobile terminal comprises a first screen area provided with a first vibration unit, and a second screen area provided with a second vibration unit; the computer program, when executed by the processor, causes the processor to perform:
detecting a first folding state of the first screen area relative to the second screen area; and
controlling working states of the first vibration unit and the second vibration unit according to the first folding state in a scenario that audio output is satisfied;
wherein the computer program, when executed by the processor, causes the processor to perform:
controlling the first vibration unit and the second vibration unit to vibrate in the case of detecting that the first screen area does not fold relative to the second screen area; and
controlling a first target vibration unit to vibrate and controlling a second target vibration unit to be stationary in the case of detecting that the first screen area folds relative to the second screen area;
wherein the first target vibration unit is the first vibration unit and the second target vibration unit is the second vibration unit; or the first target vibration unit is the second vibration unit and the second target vibration unit is the first vibration unit.

13. The mobile terminal according to claim 12, wherein the computer program, when executed by the processor, causes the processor to perform:
detecting a first folding angle of the first screen area relative to the second screen area;
wherein if the first folding angle is less than a preset angle, it is determined that the first screen area doesn't fold relative to the second screen area, and if the first folding angle is greater than or equal to the preset angle, it is determined that the first screen area folds relative to the second screen area.

14. The mobile terminal according to claim 13, wherein the computer program, when executed by the processor, causes the processor to perform:
weakening a vibration intensity of the second target vibration unit according to the first folding angle during a process that the first folding angle increases.

15. The mobile terminal according to claim 13, wherein the computer program, when executed by the processor, causes the processor to perform:
increasing a vibration intensity of the first target vibration unit according to the first folding angle during a process that the first folding angle increases.

16. A non-transitory computer-readable storage medium, wherein the non-transitory computer-readable storage medium stores a computer program, and the computer program, when executed by a processor, causes the processor to perform:
detecting a first folding state of a first screen area of a mobile terminal relative to a second screen area of the mobile terminal; and
controlling working states of a first vibration unit and a second vibration unit of the mobile terminal according to the first folding state in a scenario that audio output is satisfied;
wherein the first vibration unit is disposed within the first screen area, and the second vibration unit is disposed within the second screen area;
wherein the computer program, when executed by a processor, causes the processor to perform:
controlling the first vibration unit and the second vibration unit to vibrate in the case of detecting that the first screen area does not fold relative to the second screen area; and
controlling a first target vibration unit to vibrate and controlling a second target vibration unit to be stationary in the case of detecting that the first screen area folds relative to the second screen area;
wherein the first target vibration unit is the first vibration unit and the second target vibration unit is the second vibration unit; or the first target vibration unit is the second vibration unit and the second target vibration unit is the first vibration unit.

17. The non-transitory computer-readable storage medium according to claim 16, wherein the computer program, when executed by a processor, causes the processor to perform:
detecting a first folding angle of the first screen area relative to the second screen area;
wherein if the first folding angle is less than a preset angle, it is determined that the first screen area doesn't fold relative to the second screen area; if the first folding angle is greater than or equal to the preset angle, it is determined that the first screen area folds relative to the second screen area.

18. The non-transitory computer-readable storage medium according to claim 17, wherein the computer program, when executed by a processor, causes the processor to perform:
weakening a vibration intensity of the second target vibration unit according to the first folding angle during a process that the first folding angle increases.

19. The non-transitory computer-readable storage medium according to claim 18, wherein the computer program, when executed by a processor, causes the processor to perform:
increasing a vibration intensity of the first target vibration unit according to the first folding angle during a process that the first folding angle increases.

20. The non-transitory computer-readable storage medium according to claim 17, wherein the computer program, when executed by a processor, causes the processor to perform:
 controlling the second target vibration unit to vibrate in the case of detecting that the first folding angle is reduced to less than the preset angle.

* * * * *